US010525909B2

United States Patent
Endo

(10) Patent No.: US 10,525,909 B2
(45) Date of Patent: Jan. 7, 2020

(54) VEHICLE SYSTEM AND VEHICLE MODULE

(71) Applicant: Yazaki Corporation, Tokyo (JP)

(72) Inventor: Takashi Endo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 26 days.

(21) Appl. No.: 15/399,492

(22) Filed: Jan. 5, 2017

(65) Prior Publication Data
US 2017/0201584 A1 Jul. 13, 2017

(30) Foreign Application Priority Data
Jan. 13, 2016 (JP) ................................ 2016-004332

(51) Int. Cl.
*B60R 16/023* (2006.01)
*H04L 29/08* (2006.01)
*H04B 3/54* (2006.01)
*H04L 12/10* (2006.01)
*H04L 12/66* (2006.01)
*B60R 16/03* (2006.01)
*H04W 80/02* (2009.01)
(Continued)

(52) U.S. Cl.
CPC ........ *B60R 16/023* (2013.01); *B60R 16/0231* (2013.01); *B60R 16/03* (2013.01); *H04B 3/54* (2013.01); *H04L 12/10* (2013.01); *H04L 12/66* (2013.01); *H04L 67/12* (2013.01); *H04L 2012/40273* (2013.01); *H04W 80/02* (2013.01); *H04W 88/16* (2013.01)

(58) Field of Classification Search
CPC ......... B60R 22/18; B60R 22/22; B60R 22/24; B60R 22/26; B60R 2012/01054; B60R 2021/01286; B60R 2021/01293; B60R 16/023; B60R 16/0231; B60R 16/03; H04L 67/12
See application file for complete search history.

(56) References Cited

U.S. PATENT DOCUMENTS 5,508,689 A    4/1996 Rado et al.
5,623,169 A *  4/1997 Sugimoto ........... B60R 16/0207
                                              307/10.1
(Continued)

FOREIGN PATENT DOCUMENTS

CN    102724091 A    10/2012
CN    203419086 U    2/2014
(Continued)

OTHER PUBLICATIONS

Japanese Office Action for the related Japanese Patent Application No. 2016-004332 dated Mar. 6, 2018.
(Continued)

*Primary Examiner* — Ashley Shivers
(74) *Attorney, Agent, or Firm* — Kenealy Vaidya LLP

(57) ABSTRACT

A vehicle system is provided with a plurality of vehicle modules each modularized depending on the assembly structure of a vehicle, the vehicle modules each including a gateway unit connected with a plurality of devices different in protocol from each other in the vehicle in a communicable manner, and a trunk line that connects between the gateway units of the respective vehicle modules.

17 Claims, 8 Drawing Sheets

(51) Int. Cl.
*H04W 88/16* (2009.01)
*H04L 12/40* (2006.01)

(56) References Cited

U.S. PATENT DOCUMENTS

| | | | |
|---|---|---|---|
| 2003/0094319 A1 | 5/2003 | Chernoff et al. | |
| 2003/0236596 A1 | 12/2003 | Eisenmann et al. | |
| 2006/0197378 A1 | 9/2006 | Nagasawa et al. | |
| 2007/0262652 A1* | 11/2007 | Kilroy | H03K 17/0822 307/116 |
| 2009/0138136 A1* | 5/2009 | Natsume | B60R 16/0315 701/1 |
| 2010/0131816 A1* | 5/2010 | Yamamoto | H04L 12/4013 714/749 |
| 2010/0329272 A1 | 12/2010 | Tsuboi et al. | |
| 2012/0187905 A1 | 7/2012 | Kanayama | |
| 2014/0088794 A1* | 3/2014 | Yashiro | H04W 52/0216 701/2 |
| 2014/0096144 A1* | 4/2014 | Fuchs | G06F 9/542 719/313 |
| 2014/0226673 A1* | 8/2014 | Hirashima | H04L 12/40006 370/401 |
| 2014/0297109 A1 | 10/2014 | Shimomura et al. | |
| 2015/0197193 A1* | 7/2015 | Oba | B60Q 3/76 315/80 |
| 2016/0129789 A1* | 5/2016 | Halford | B60W 50/14 701/36 |
| 2017/0046762 A1* | 2/2017 | Arita | B60L 11/18 |

FOREIGN PATENT DOCUMENTS

| | | |
|---|---|---|
| CN | 104079456 A | 10/2014 |
| EP | 1 359 056 A2 | 11/2003 |
| EP | 1 361 713 A1 | 11/2003 |
| FR | 2 986 759 A1 | 8/2013 |
| JP | 10-119671 A | 5/1998 |
| JP | 2000-302034 A | 10/2000 |
| JP | 2001-213248 A | 8/2001 |
| JP | 2004-306697 A | 11/2004 |
| JP | 2005-47354 A | 2/2005 |
| JP | 2005-231595 A | 9/2005 |
| JP | 2007-336267 A | 12/2007 |
| JP | 2010-167834 A | 8/2010 |
| JP | 2011-16476 A | 1/2011 |
| JP | 2011-201527 A | 10/2011 |
| JP | 2012-168922 A | 9/2012 |
| JP | 2014-162286 A | 9/2014 |
| JP | 2015-20579 A | 2/2015 |

OTHER PUBLICATIONS

Extended European search report for the related European Patent Application No. 17151102.5 dated Jun. 7, 2017.
European Office Action for the related European Patent Application No. 17151102.5 dated Apr. 16, 2018.
Chinese Office Action for the related Chinese Patent Application No. 201710021100.6 dated Nov. 5, 2018.
Japanese Office Action for the related Japanese Patent Application No. 2016-004332 dated Nov. 6, 2018.
European Office Action for the related European Patent Application No. 17151102.5 dated Feb. 18, 2019.
Japanese Office Action for the related Japanese Patent Application No. 2016-004332 dated May 7, 2019.
Japanese Office Action for the related Japanese Patent Application No. 2018-128158 dated Apr. 16, 2019.

* cited by examiner

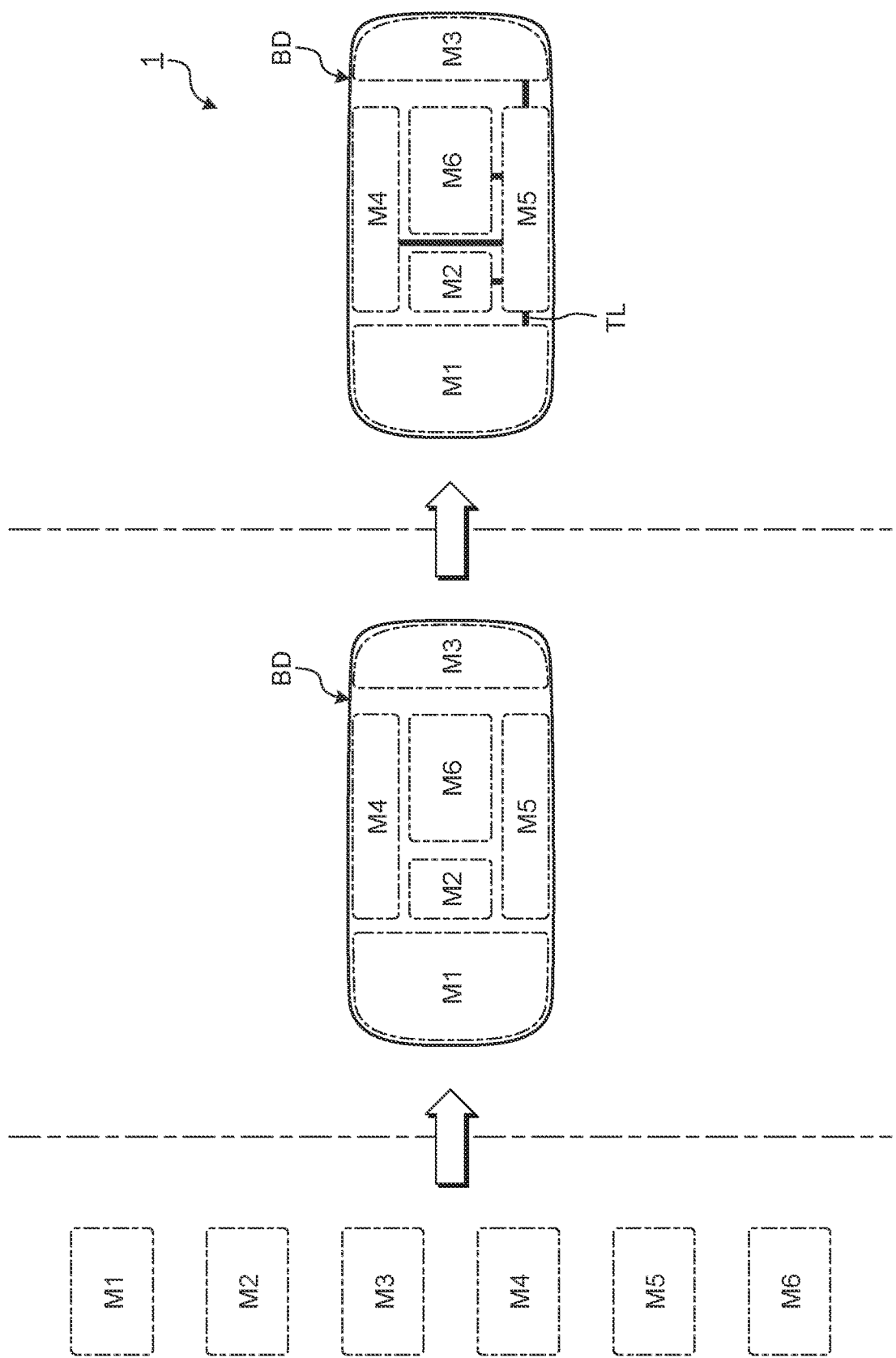

VEHICLE SYSTEM AND VEHICLE MODULE

CROSS-REFERENCE TO RELATED APPLICATION(S)

The present application claims priority to and incorporates by reference the entire contents of Japanese Patent Application No. 2016-004332 filed in Japan on Jan. 13, 2016.

BACKGROUND OF THE INVENTION

1. Field of the Invention

The present invention relates to a vehicle system and a vehicle module.

2. Description of the Related Art

Conventionally, the communication between various kinds of communication devices in a vehicle has been performed such that the communication device transmits and receives signals through electric wires or the like (see Japanese Patent Application Laid-open No. 2012-168922).

A plurality of communication devices different in protocol from each other tend to be mounted on a vehicle in accordance with diversification of in-vehicle devices, and there remains much room for further improvement in terms of completing a vehicle by combining efficiently vehicle modules each of which mounts the above-mentioned communication devices thereon.

SUMMARY OF THE INVENTION

The present invention has been made under such circumferences, and it is an object of the present invention to provide a vehicle system in which the devices different in protocol from each other can be communicated with each other in the vehicle, and the vehicle can be completed by combining efficiently the vehicle modules.

In order to solve the above mentioned problems and achieve the above mentioned object, a vehicle system according to one aspect of the present invention includes a plurality of vehicle modules each modularized depending on an assembly structure of a vehicle, the vehicle modules each including a gateway unit connected with a plurality of devices different in protocol from each other in the vehicle in a communicable manner; and a trunk line connecting between the gateway units of the respective vehicle modules.

According to another aspect of the present invention, in the vehicle system, it is preferable that each of the vehicle modules is modularized depending on a position of the vehicle module provided to a body of the vehicle.

According to still another aspect of the present invention, in the vehicle system, it is preferable that the gateway unit includes a transmission determination unit connected to two or more devices different in protocol from each other in the same vehicle module in a communicable manner, the transmission determination unit being configured to determine, when a signal is input from any of the devices connected in a communicable manner to the transmission determination unit, a device or other gateway unit each constituting a transmission destination of information corresponding to the signal input, and transmit the information to the transmission destination, and a transmission function unit configured to receive an input of the information transmitted by the transmission determination unit of the other gateway unit, determine a device constituting a transmission destination of the information input, and transmit the information to the transmission destination.

According to still another aspect of the present invention, in the vehicle system, it is preferable that the gateway unit includes a wired communication unit connecting the gateway unit and the device in at least the same vehicle module by wire in a communicable manner.

According to still another aspect of the present invention, in the vehicle system, it is preferable that the gateway unit includes a wireless communication unit connecting the gateway unit and the device in at least the same vehicle module wirelessly in a communicable manner.

According to still another aspect of the present invention, in the vehicle system, it is preferable that at least one of the vehicle modules further includes a power controller configured to receive power from a vehicle battery, and distribute and supply the power received to power-required devices requiring the supply of the power in the same vehicle module; and a trunk line connection unit connecting the trunk lines in the vehicle, and the gateway unit, the power controller, and the trunk line connection unit constitute a vehicle module controller.

According to still another aspect of the present invention, in the vehicle system, it is preferable that the trunk line includes an inter-module communication line configured to transmit information between the gateway units in the respective vehicle modules, and an inter-module power line configured to transfer power between the power controllers in the respective vehicle modules.

According to still another aspect of the present invention, in the vehicle system, it is preferable that the gateway unit is connected with an in-vehicle router capable of communicating with communication devices outside the vehicle via the trunk lines.

According to still another aspect of the present invention, in the vehicle system, it is preferable that the vehicle modules includes a front module provided to a front part of the body of the vehicle, an instrument panel module provided adjacent to the front part of the body of the vehicle in an instrument panel arranged in a passenger compartment, a rear module provided to a rear part of the body of the vehicle, a first floor module provided along a floor located between the front part and the rear part of the body of the vehicle, a second floor module provided along the floor of the body of the vehicle in parallel with the first floor module, and a roof module provided to a roof arranged to face the floor of the body of the vehicle in a height direction.

A vehicle module according to still another aspect of the present invention includes a gateway unit connected with a plurality of devices different in protocol from each other in a vehicle in a communicable manner; and a trunk line connection unit connecting the trunk lines in the vehicle.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is an explanatory view illustrating one example of a vehicle production flow in which the vehicle modules according to the present embodiment are assembled and thereafter, a trunk line is connected to each vehicle module.

DETAILED DESCRIPTION OF THE PREFERRED EMBODIMENTS

A mode for carrying out the present invention (hereinafter, referred to as "embodiment") is specifically explained with reference to drawings. The present invention is not limited to the contents described in the following embodiment. Furthermore, constitutional features in the following embodiment include a part that is easily conceivable by those skilled in the art, or parts substantially equal to each other. The constitutions described below can be combined optionally with each other. In addition, various abbreviations, substitutions, or modifications of the constitutions described below can be made without departing from the gist of the present invention.

Embodiment

Figure 1:
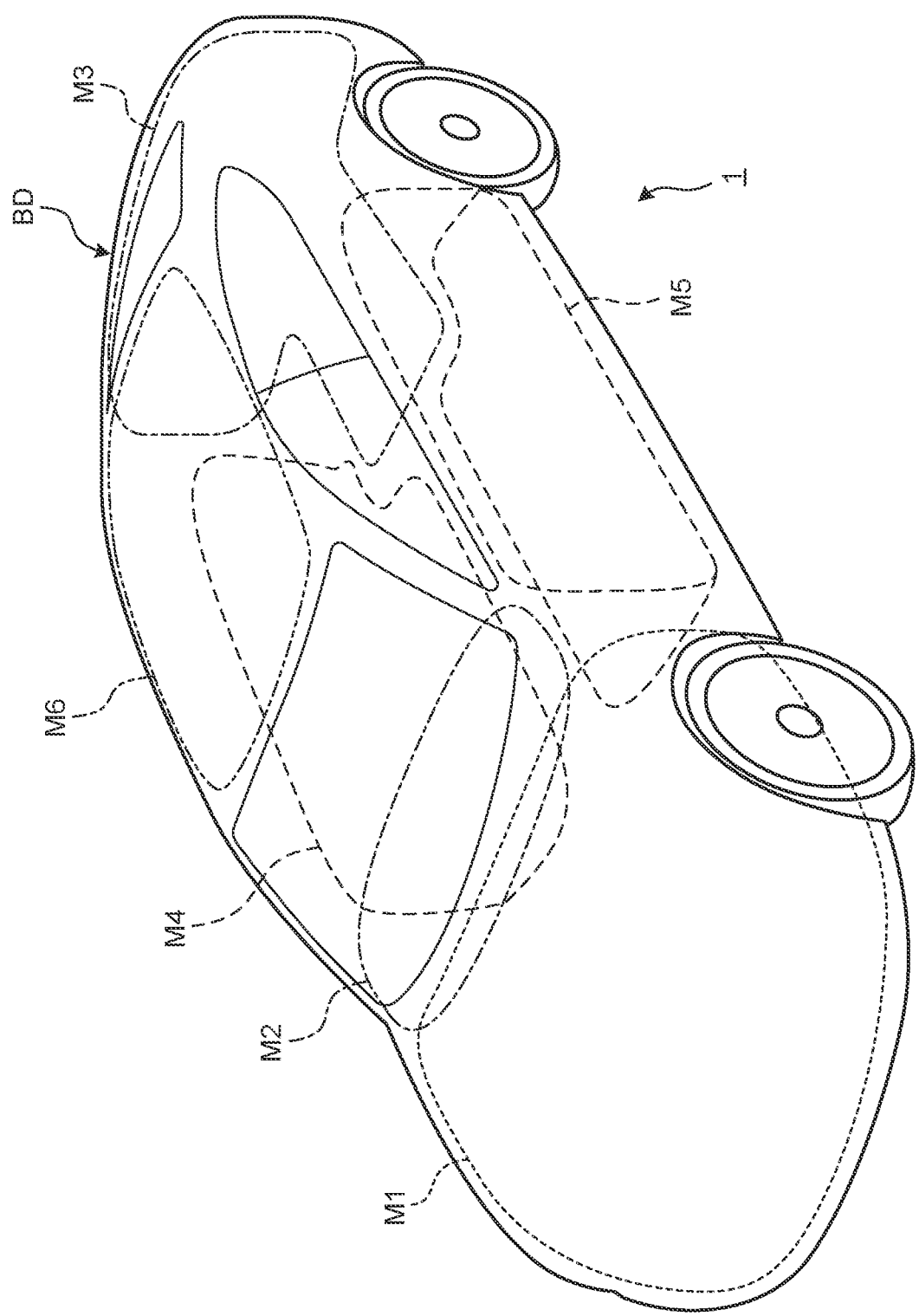
FIG. 1 is a schematic structural view of a vehicle system according to the present embodiment.
Figure 2:
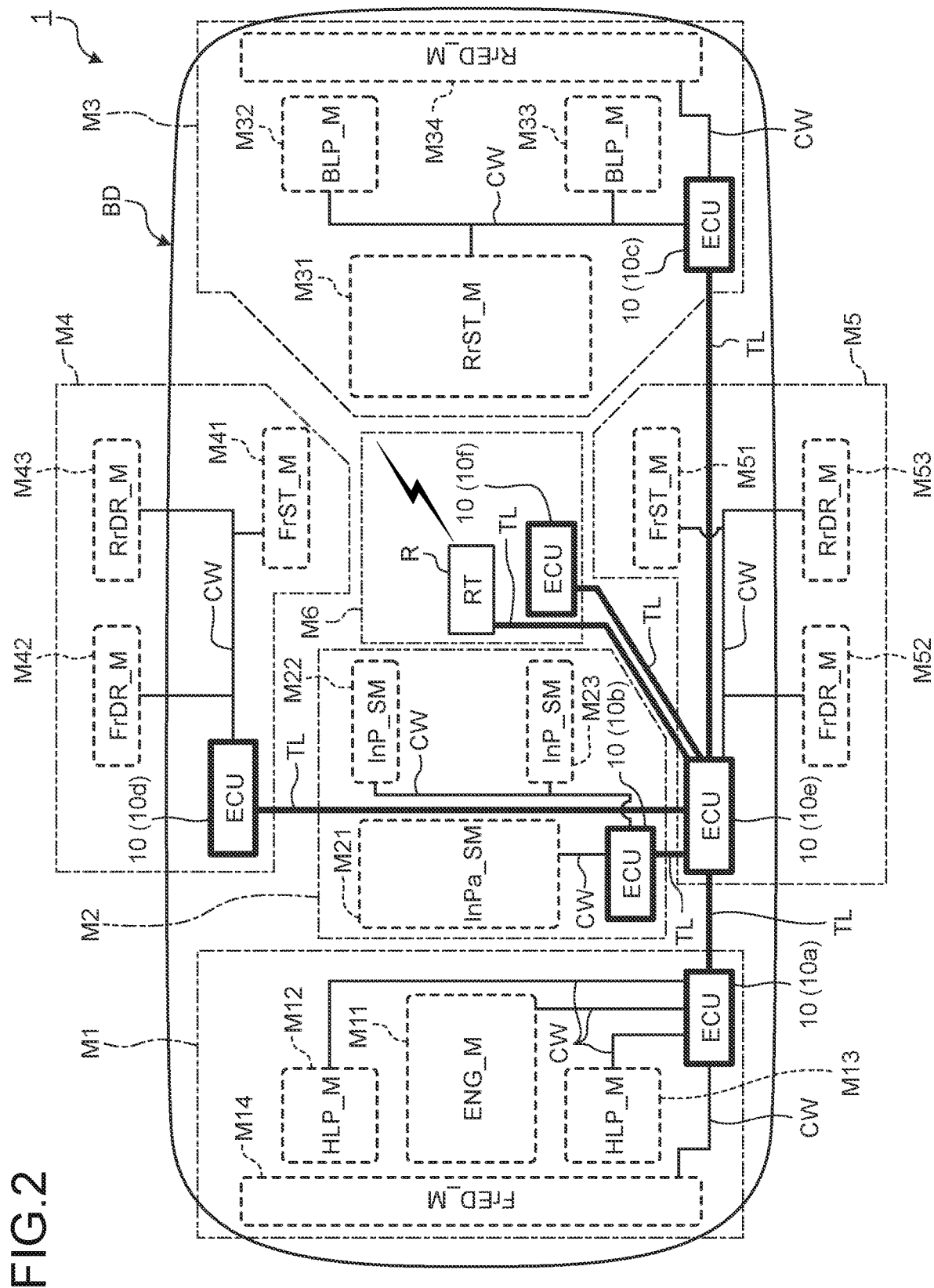
FIG. 2 is a functional block diagram illustrating the outline of the vehicle system according to the present embodiment.
Figure 3:
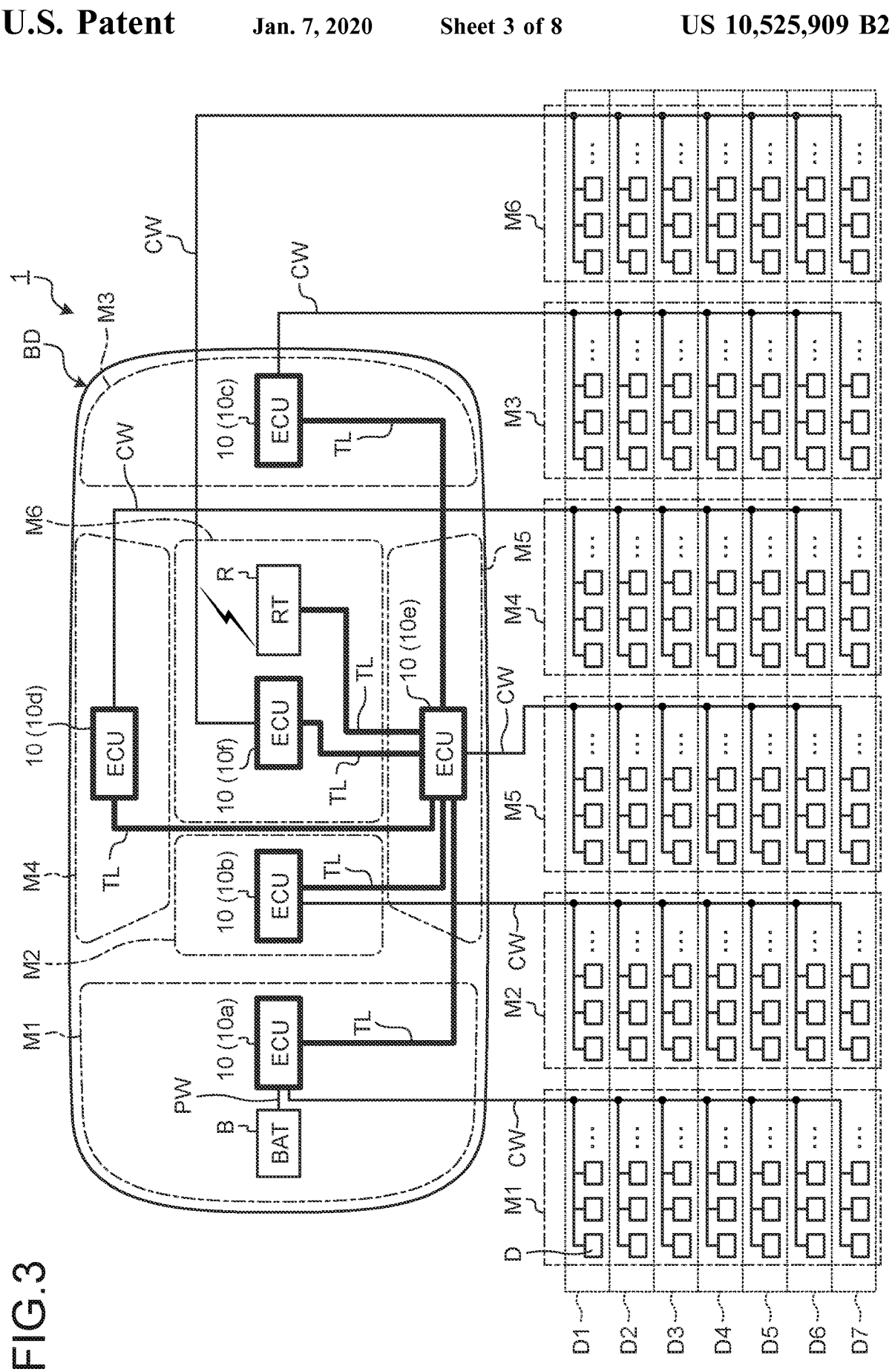
FIG. 3 is a functional block diagram illustrating the detail of the vehicle system according to the present embodiment.
Figure 4:
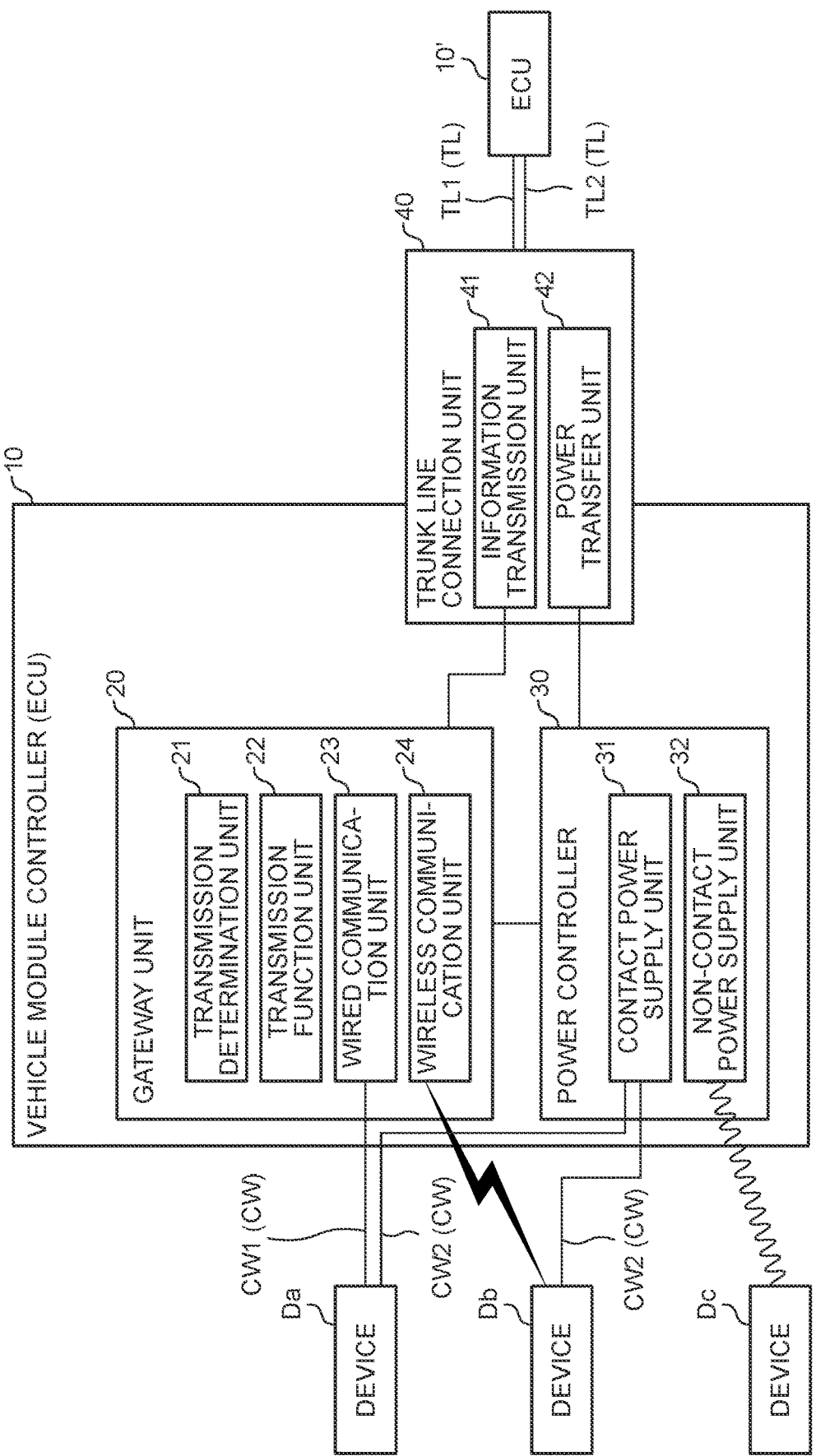
FIG. 4 is a functional block diagram illustrating the detail of a vehicle module controller according to the present embodiment.
Figure 5:
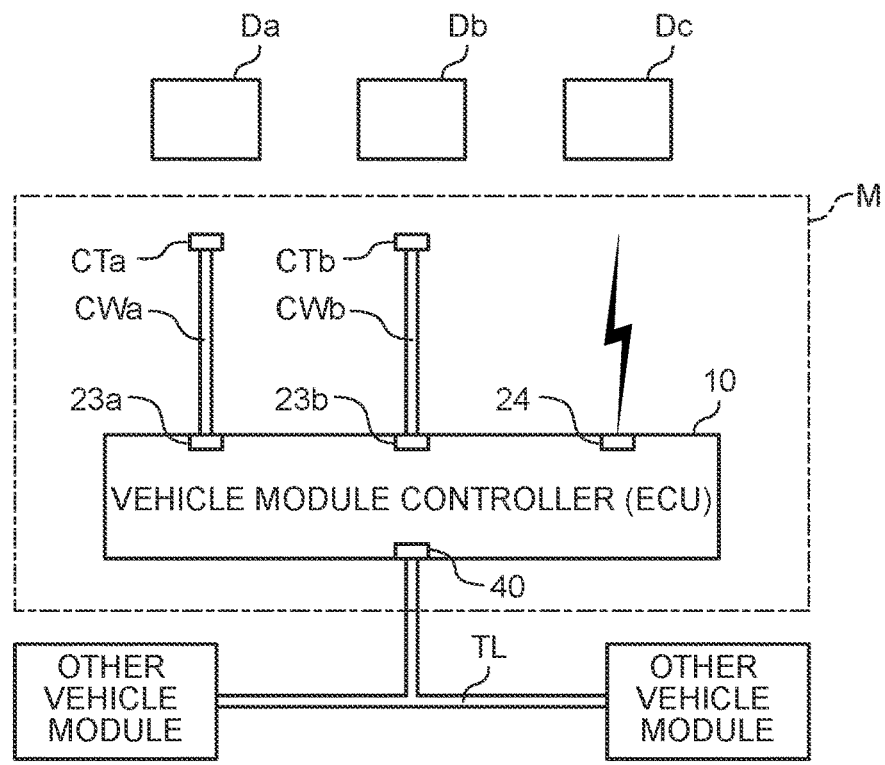
FIG. 5 is a schematic view illustrating one configuration of a vehicle module according to the present embodiment.
Figure 6:
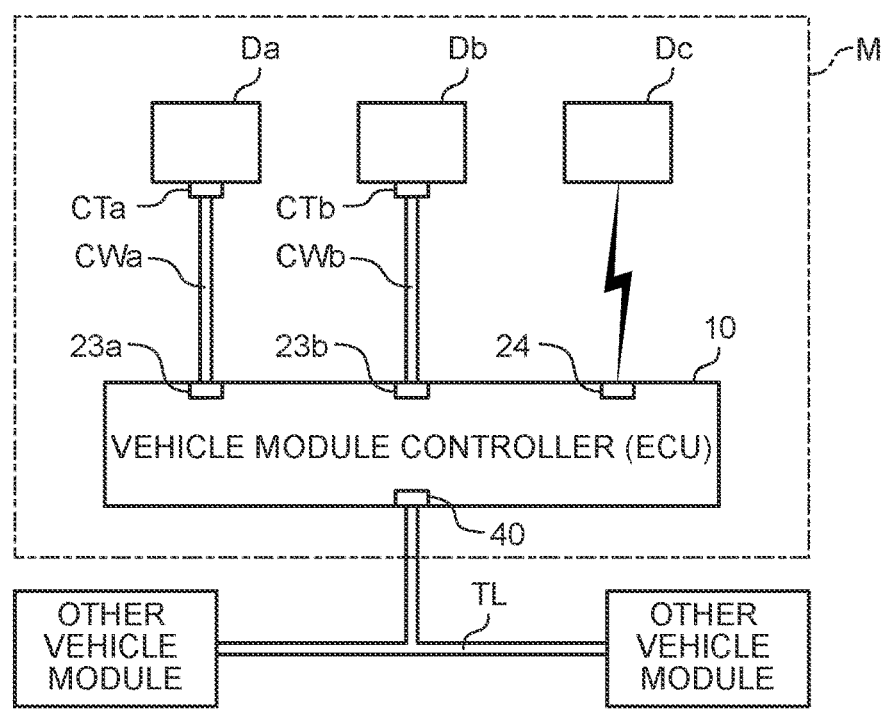
FIG. 6 is a schematic view illustrating another configuration of the vehicle module according to the present embodiment.
Figure 7:
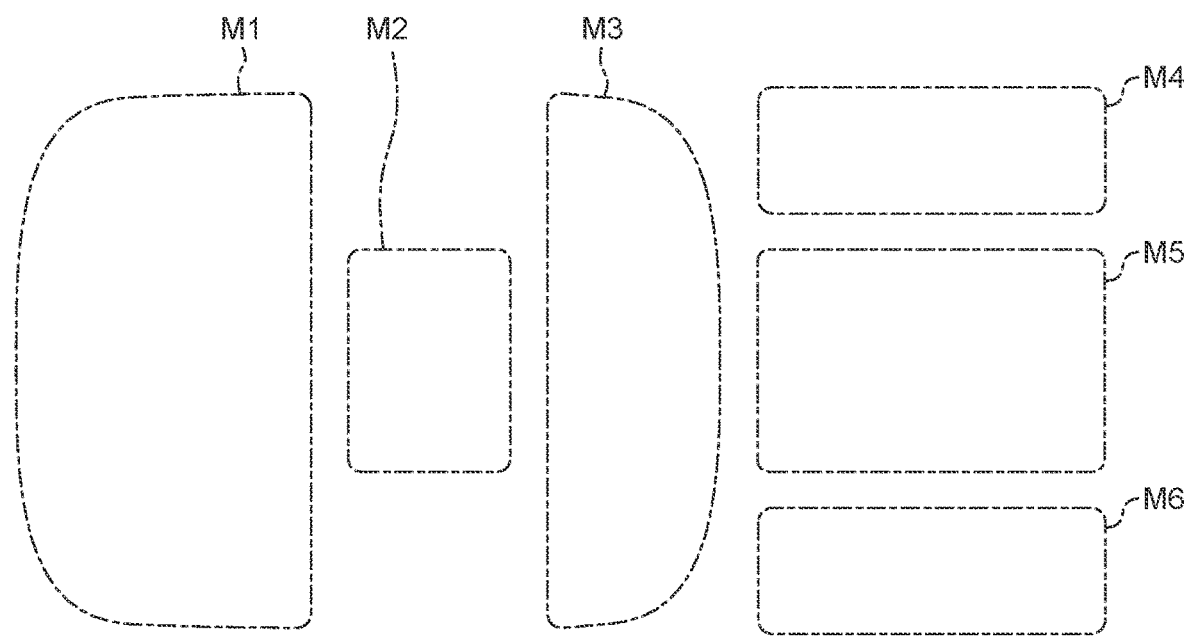
FIG. 7 is an explanatory view illustrating a plurality of vehicle modules according to the present embodiment.
Figure 8:
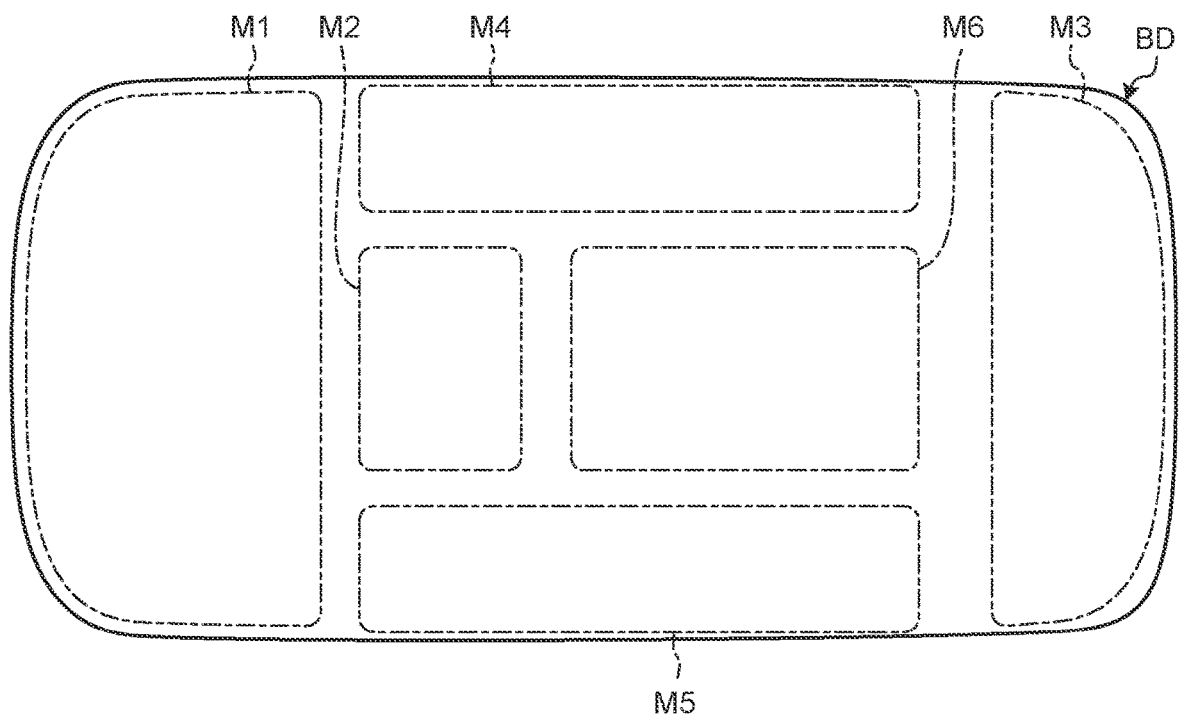
FIG. 8 is an explanatory view illustrating a plurality of vehicle modules according to the present embodiment.
Figure 9:
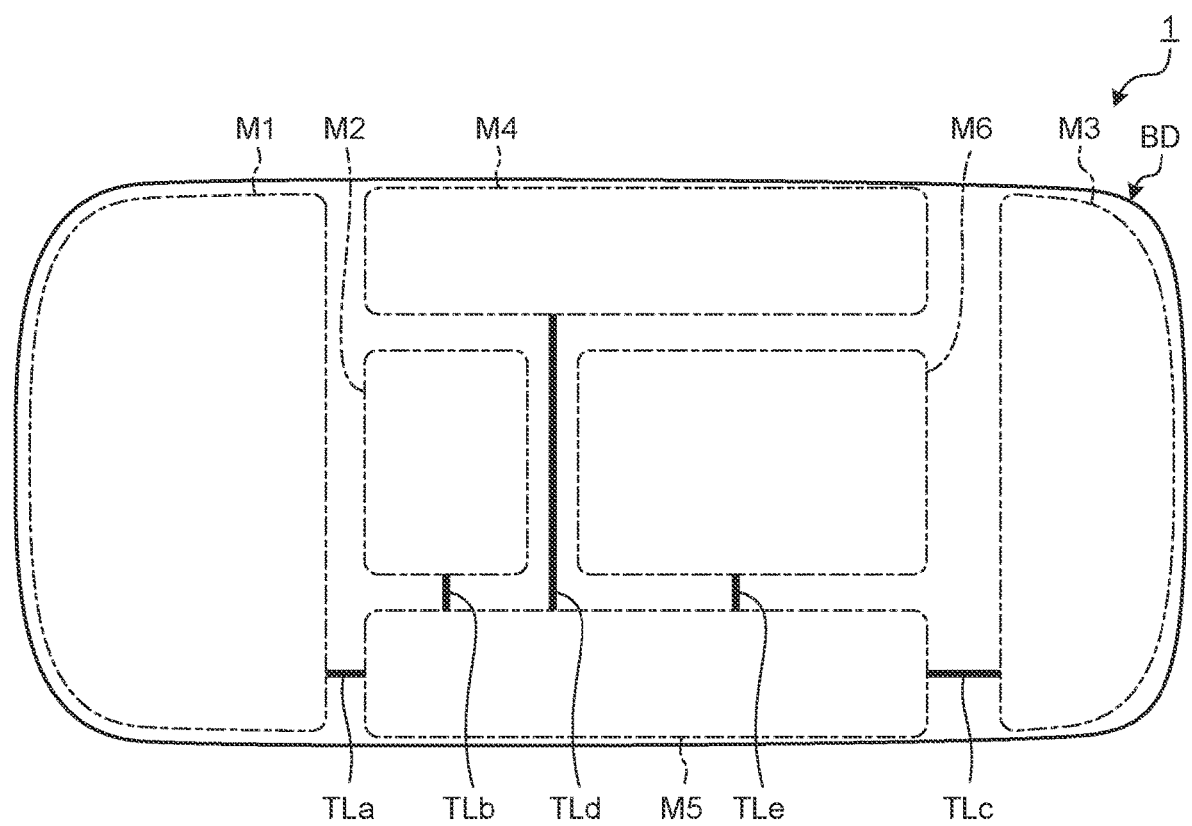
FIG. 9 is an explanatory view illustrating the vehicle modules according to the present embodiment.

A vehicle system according to the embodiment is explained. FIG. 1 is a schematic structural view of a vehicle system according to the present embodiment. FIG. 2 is a functional block diagram illustrating the outline of the vehicle system according to the present embodiment. FIG. 3 is a functional block diagram illustrating the detail of the vehicle system according to the present embodiment. FIG. 4 is a functional block diagram illustrating the detail of a vehicle module controller according to the present embodiment. FIG. 5 is a schematic view illustrating one configuration of a vehicle module according to the present embodiment. FIG. 6 is a schematic view illustrating another configuration of the vehicle module according to the present embodiment. FIG. 7 to FIG. 9 are explanatory views each illustrating a plurality of vehicle modules according to the present embodiment. FIG. 10 is an explanatory view illustrating one example of a vehicle production flow in which the vehicle modules according to the present embodiment are assembled and thereafter, a trunk line is connected to each vehicle module.

As illustrated in FIG. 1, a vehicle system 1 according to the present embodiment is constituted of a plurality of vehicle modules M1 to M6 each of which is modularized depending on the assembly structure of a vehicle. Furthermore, as illustrated in FIG. 2 to FIG. 4, the vehicle system 1 according to the present embodiment also functions as a communication control system that performs communications between a plurality of devices D different in protocol from each other in the vehicle, and a power control system of the devices D.

Each of the vehicle modules M1 to M6 according to the present embodiment is, as illustrated in FIG. 1, a structural module modularized depending on the assembly structure of a vehicle, and also, as illustrated in FIG. 2 to FIG. 4, a communication/power-control module corresponding to the respective structural modules. Each of the vehicle modules M1 to M6 is, as illustrated in FIG. 1, modularized depending on a position at which each vehicle module is arranged in a body BD of the vehicle. In the present embodiment, although each of the vehicle modules M1 to M6 is explained as one example, any desired vehicle module M can be adopted provided that the vehicle module M is modularized depending on the assembly structure of the vehicle, and the number, constitution, position or the like of the vehicle module M is not limited. Furthermore, the number of the vehicle modules M is preferably set to 10 or less.

As illustrated in FIG. 1, the vehicle modules M1 to M6 include a front module M1, an instrument panel module M2, a rear module M3, a first floor module M4, a second floor module M5, and a roof module M6. Here, for the sake of convenience, in the following explanations of FIG. 1 and FIG. 2, the vehicle modules M1 to M6 are separately referred to as the front module M1, the instrument panel module M2, the rear module M3, the first floor module M4, the second floor module M5, and the roof module M6. However, in the explanation of FIG. 3 or later, these vehicle modules are not differentiated, and collectively referred to as "vehicle modules M1 to M6".

The front module M1 is, as illustrated in FIG. 1, a vehicle module arranged in the front part of the body BD of the vehicle. The front module M1 further includes, as illustrated in FIG. 2, an engine module M11, headlamp modules M12 and M13, and a front end module M14. The engine module M11 is a sub module in which an engine, various devices around the engine, and various devices related to engine control are connected with each other in a communicable manner. Each of the headlamp modules M12 and M13 is a sub module in which a headlamp, and various devices such as a sensor and a motor that are related to headlamp control are connected with each other in a communicable manner. The front end module M14 is a sub module in which various types of sensors or the like for detecting the conditions in the traveling direction of the vehicle, various devices related to sensor control, and the like are connected with each other in a communicable manner. In the following explanation, the engine module M11, the headlamp modules M12 and M13, and the front end module M14 may be referred simply to as "sub modules M11 to M14". In each of the engine module M11, the headlamp modules M12 and M13, and the front end module M14, a vehicle module controller 10a arranged in the front module M1, and the device D in each of the sub modules M11 to M14 are connected with each other via a connection line CW. The communication and power of the device D in each of the sub modules M11 to M14 are controlled by the vehicle module controller 10a.

The instrument panel module M2 is, as illustrated in FIG. 1, a vehicle module placed in an instrument panel arranged adjacent to the front part of the body BD of the vehicle in a passenger compartment. The instrument panel module M2 further includes, as illustrated in FIG. 2, an instrument panel upper sub module M21, and instrument panel sub modules M22 and M23. The instrument panel upper sub module M21 is a sub module to which various devices such as meters arranged in the instrument panel, a head-up display (HUD), a carrying-in device, and a display are connected in a communicable manner. Each of the instrument panel sub modules M22 and M23 is a sub module to which various devices such as a switch and a motor that are related to the control of a turn-signal lamp, side-view mirror adjustments, or the like are connected in a communicable manner. In the following explanation, the instrument panel upper sub module M21, and the instrument panel sub modules M22 and M23 may be referred simply to as "sub modules M21 to M23". In each of the instrument panel upper sub module M21 and the instrument panel sub modules M22 and M23, a vehicle module controller 10*b* arranged in the instrument panel module M2, and the device D in each of sub modules M21 to 23 are connected with each other via the connection line CW. The communication and power of the device D in each of the sub modules M21 to M23 are controlled by the vehicle module controller 10*b*.

The rear module M3 is, as illustrated in FIG. 1, a vehicles module arranged in the rear part of the body BD of the vehicle. The rear module M3 further includes, as illustrated in FIG. 2, a rear seat module M31, back lamp modules M32 and M33, and a rear end module M34. The rear seat module M31 is a sub module in which various devices such as a switch and a motor that are related to the control of seat adjustments or the like are connected with each other in a communicable manner. Each of the back lamp modules M32 and M33 is a sub module in which various devices such as a back lamp, and a sensor related to headlamp control are connected with each other in a communicable manner. The rear end module M34 is a sub module to which various types of sensors for detecting the condition in the direction opposite to the traveling direction of the vehicle, various devices related to sensor control, and the like are connected in a communicable manner. In the following explanation, the rear seat module M31, the back lamp modules M32 and M33, and the rear end module M34 may be referred simply to as "sub modules M31 to M34". In each of the rear seat module M31, the back lamp modules M32 and M33, and the rear end module M34, a vehicle module controller 10*c* arranged in the rear module M3, and the device D in each of the sub modules M31 to 34 are connected with each other via the connection line CW. The communication and power of the device D in each of the sub modules M31 to M34 are controlled by the vehicle module controller 10*c*.

The first floor module M4 is, as illustrated in FIG. 1, a vehicle module arranged along a floor located between the front part and the rear part of the body BD of the vehicle. The first floor module M4 further includes, as illustrated in FIG. 2, a front seat module M41, a front door module M42, and a rear door module M43. In the present embodiment, the first floor module M4 is arranged along a floor on the right side of the vehicle. The front seat module M41 is a sub module to which various devices such as a switch, a motor, and a sensor that are related to the control of seat adjustment, a warning depending on whether a seat belt is fastened or not, or the like are connected in a communicable manner. The front door module M42 is a sub module to which various devices such as a sensor for detecting the conditions on the right side of the vehicle, and a switch and a motor that are related to the control of window opening/closing are connected in a communicable manner. The rear door module M43 is a sub module to which various devices such as a sensor for detecting the conditions on the right side of the vehicle, and a switch and a motor that are related to the control of window opening/closing, slide door opening/closing, or assistant step elevating are connected in a communicable manner. In the following explanation, the front seat module M41, the front door module M42, and the rear door module M43 may be referred simply to as "sub modules M41 to M43. In each of the front seat module M41, the front door module M42, and the rear door module M43, the vehicle module controller 10*d* arranged in the first floor module M4, and the device D in each of the sub modules M41 to M43 are connected with each other via the connection line CW. The communication and power of the device D in each of the sub modules M41 to M43 are controlled by the vehicle module controller 10*d*.

The second floor module M5 is, as illustrated in FIG. 1, a vehicle module arranged parallel to the first floor module M4 along the floor of the body BD of the vehicle. The second floor module M5 further includes, as illustrated in FIG. 2, a front seat module M51, a front door module M52, and a rear door module M53. In the present embodiment, the second floor module M5 is arranged along the floor on the left side of the vehicle. The front seat module M51 is a sub module to which various devices such as a switch, a motor, and a sensor that are related to the control of seat adjustment, a warning depending on whether a seat belt is fastened or not, or the like are connected in a communicable manner. The front door module M52 is a sub module to which various devices such as a sensor for detecting the conditions on the left side of the vehicle, and a switch and a motor that are related to the control of window opening/closing are connected in a communicable manner. The rear door module M53 is a sub module to which various devices such as a sensor for detecting the conditions on the left side of the vehicle, and a switch and a motor that are related to the control of window opening/closing, slide door opening/closing, or assistant step elevating are connected in a communicable manner. In the following explanation, the front seat module M51, the front door module M52, and the rear door module M53 may be referred simply to as "sub modules M51 to M53. In each of the front seat module M51, the front door module M52, and the rear door module M53, the vehicle module controller 10*e* arranged in the second floor module M5, and the device D in each of the sub modules M51 to M53 are connected with each other via the connection line CW. The communication and power of the device D in each of the sub modules M51 to M53 are controlled by the vehicle module controller 10*e*.

The roof module M6 is, as illustrated in FIG. 1, a vehicle module provided to the roof arranged to face the floor of the body BD of the vehicle in the height direction. The roof module M6 connects thereto various devices such as a switch related to a lamp in a passenger compartment or ramp control, various device such as a switch and a motor that are related to sunroof opening/closing, sunshade opening/closing, or the like in a communicable manner. The communication and power of the device D in the roof module M6 are controlled by a vehicle module controller 10*f*. In the present embodiment, the roof module M6 includes, as illustrated in FIG. 2, at least an in-vehicle router R or the like capable of communicating with a communication device outside the vehicle. The in-vehicle router R is connected with the vehicle module controllers 10*a* to 10*f* provided respectively to the front module M1, the instrument panel module M2, the rear module M3, the first floor module M4, the second floor module M5, and the roof module M6 in the vehicle via trunk lines TL. The in-vehicle router R communicates with the communication device outside the vehicle by wide area wireless or narrow area wireless. Here, the system of wide area wireless includes a radio system (AM, FM), a TV system (UHF, 4K, 8K), a TEL system, the Global Positioning System (GPS), Worldwide Interoperability for Microwave Access (WiMAX (registered trademark)), a car-to-car communication system, or the like. Furthermore, the systems of narrow area wireless includes the electronic toll collection system/dedicated short range communication system (ETC/DSRC), the Vehicle Information and Communication System (VICS (registered trademark)), a wireless LAN, a millimeter wave communication system, or the like.

As illustrated in FIG. 3, in the present embodiment, the devices D are all capable of performing communication. The plurality of devices D are formed of a body system device group D1, a safety system device group D2, a power train system device group D3, a multimedia system device group D4, an electrical power system device group D5, a diagnosis system device group D6, and a charging system device group D7 that are formed as groups separated from each other. Hereinafter, the description will be made by adding symbol D to all of the devices, or some of the devices whose belonging to any one of the device groups D1 to D7 does not matter. Furthermore, in FIG. 3, for the sake of simple explanation, in respect to the arrangement of devices D belonging to each of the device group D1 to D7 in any one of the vehicle modules M1 to M6, the case that three or more devices D are arranged in each of the device groups D1 to D7 is illustrated as one example. However, the number and the arrangement of the devices D are determined based on the constitution of each vehicle module, and the present invention is not limited to this example. Hereinafter, although the examples of the devices D included in each of the device groups D1 to D7 are explained, the present invention is not limited to these examples.

The body system device group D1 includes a power swing door, a memory sheet, an air conditioner, a meter, a shift-by-wire device, a lighting fixture, a rear controller, a power trunk, or the like. The communication protocol of the body system device group D1 is Controller Area Network (CAN), CAN with Flexible Data Rate (CAN-FD), Local Interconnect Network (LIN), Clock Extension Peripheral Interface (CXPI), Narrow Area Wireless, Weak Radio Waves, Near Field Communication (NFC), Giga-IR, Ultra Wide Band (UWB), or the like.

The safety system device group D2 includes a yaw rate sensor, an air bag, a wheel-side sensor, an automatic-driving electronic control unit (ECU), or the like. The communication protocol of the safety system device group D2 is Ethernet (registered trademark), Digital Speech Interpolation (DSI), Radio Transmission, or the like.

The power train system device group D3 includes a hybrid controller, a steering sensor, an engine, a suspension, a steering-by-wire device, a transmission, a battery sensor, a brake-by-wire device, or the like. The communication protocol of the power train system device group D3 is Ethernet (registered trademark) or the like.

The multimedia system device group D4 includes a navigation system, a display, an amplifier, an external communication unit, or the like. The communication protocol of the multimedia system device group D4 is Ethernet (registered trademark), USB3.1, Wireless LAN and Transfer Jet, NFC, Giga-IR, Submillimeter Wave, or the like.

The electrical power system device group D5 includes a power-supply-area master, a power-supply-area slave, a low voltage/high voltage battery pack, or the like. The communication protocol of the electrical power system device group D5 is CAN, Electrical Power System Backup Communication, or the like.

The diagnosis system device group D6 includes a diagnosis tool (scan tool) or the like. The communication protocol of the diagnosis system device group D6 is Ethernet (registered trademark), CAN-FD, Wireless LAN, or the like.

The charging system device group D7 includes a battery charger or the like. The communication protocol of the charging system device group D7 is HomePlug Green PHY or the like.

The vehicle system 1 according to the present embodiment is provided to a vehicle in order to perform communication between the devices D different in communication protocol from each other in the vehicle, and provided with the vehicle modules M1 to M6 each having the vehicle module controller 10 (10a to 10f), the trunk lines TL, and the connection lines CW. The trunk line TL connects between the respective vehicle module controllers 10 of the vehicle modules M1 to M6. The connection line CW connects each of the vehicle module controllers 10 and the devices D. As illustrated in FIG. 3, the vehicle module controller 10 is connected with two or more devices D different in protocol from each other through the connection lines CW.

As illustrated in FIG. 4, the vehicle module controller 10 has a function as a communication control ECU and a power control ECU for the devices D, and is provided with a gateway unit 20, a power controller 30, and a trunk line connection unit 40. The gateway unit 20, the power controller 30, and the trunk line connection unit 40 are connected with each other in a communicable and power-transferable manner.

In FIG. 4, the gateway unit 20 is a function unit that is arranged in each of the vehicle module M1 to M6, and capable of communicating with the devices D different in protocol from each other in the vehicle. The gateway unit 20 is provided with a transmission determination unit 21, a transmission function unit 22, a wired communication unit 23, and a wireless communication unit 24.

The transmission determination unit 21 determines, when a signal is input from the device D connected to the transmission determination unit 21 in a communicable manner, a transmission destination (device D or other gateway units 20) of information corresponding to the signal input, and transmits the information. The transmission function unit 22 receives an input of the information transmitted by the transmission determination unit 21 of the other gateway units 20, determines a device D that is the transmission destination of the information input, and transmits the information. The wired communication unit 23 connects the gateway unit 20 and at least one device D in the same vehicle module M by wire in a communicable manner. As illustrated in FIG. 4, the connection line CW includes an intra-module communication line CW1 that transmits information between the device D in the same vehicle module M and the gateway unit 20, and an intra-module power line CW2 that transfers power between the device D in the same vehicle module M and the power controller 30. For example, in FIG. 4, the wired communication unit 23 is connected with a device Da via the intra-module communication line CW1 in a communicable manner. The wireless communication unit 24 connects the gateway unit 20 and at least one device D in the same vehicle module M wirelessly in a communicable manner. The wireless communication unit 24 connects the gateway unit 20 and the device D in a communicable manner by short-distance radio communication such as Wireless LAN, Wifi (registered trademark), Bluetooth (registered trademark), NFC, or the like. For example, in FIG. 4, the wireless communication unit 24 is connected with a device Db in a communicable manner wirelessly communication. Here, the communication destination of the wireless communication by the wireless communication unit 24 is not limited to the device D in the same vehicle module M.

Here, the explanation is made in conjunction with one example. As illustrated in FIG. 3 and FIG. 4, a first gateway unit 20 of the vehicle module M1 receives an input of a signal from the device D of a first body system device group D1 of the vehicle module M1. In this time, the transmission determination unit 21 of the first gateway unit 20 determines whether there exists a device D that assumes a transmission destination of information corresponding to the signal input. When the transmission determination unit 21 determines that there exists the device D that assumes the transmission destination, the transmission determination unit 21 of the first gateway unit 20 transmits the information corresponding to the signal input to the device D that assumes the transmission destination. In this time, when the information is transmitted to the device D belonging to any one of the safety system device group D2, the power train system device group D3, the multimedia system device group D4, the electrical power system device group D5, the diagnosis system device group D6, and the charging system device group D7, the first gateway unit 20 converts the protocol of the device D to transmit the information.

Furthermore, the transmission determination unit 21 of the first gateway unit 20 determines whether there exists the other gateway unit 20 that assumes a transmission destination of the information corresponding to the signal input. In the present embodiment, since the number of the gateway units 20 provided to the respective vehicle modules M1 to M6 is six, the transmission determination unit 21 of the first gateway unit 20 determines whether to transmit the information corresponding to the signal input to any one of the second to sixth gateway units 20 of the respective vehicle modules M2 to M6. In this case, the transmission determination unit 21 of the first gateway unit 20 determines whether to transmit the information based on information of the device D connected to each of the second to sixth gateway units 20; that is, the device D that belongs to any one of the body system device groups D1, the safety system device group D2, the power train system device group D3, the multimedia system device group D4, the electrical power system device group D5, and the diagnosis system device group D6, and the charging system device group D7 in each of the vehicle module M2 to M6. That is, the first gateway unit 20 stores therein the information of the device D connected thereto, and the information of the device D connected to the other gateway units 20.

When the transmission determination unit 21 of the first gateway unit 20 determines to transmit, for example, the information corresponding to the signal input to the second gateway unit 20 of the vehicle module M2, the transmission determination unit 21 transmits the information corresponding to the signal input to the second gateway unit 20.

Furthermore, when the second gateway unit 20 receives an input of the above-mentioned information from the transmission determination unit 21 of the first gateway unit 20, the transmission function unit 22 of the second gateway unit 20 determines a device D that assumes a transmission destination of the information input. The transmission function unit 22 of the second gateway unit 20 transmits the information to the device D that assumes the transmission destination. In this time, when the information is transmitted to the device D that belongs to any one of the safety system device group D2, the power train system device group D3, the multimedia system device group D4, the electrical power system device group D5, the diagnosis system device group D6, and the charging system device group D7, the second gateway unit 20 converts the protocol of the device D to transmit the information. Here, the second gateway unit 20 may input thereto information after the protocol is converted in the first gateway unit 20.

As described above, although the explanation has been made by taking the case where a signal is input from the device D to which the first gateway unit 20 is connected as an example, the explanation can be made in the same manner as above even when a signal is input from the device D to which the second gateway unit 20 is connected. Furthermore, even when communication is performed between the first gateway unit 20 in the vehicle module M1, and the third to sixth gateway units 20 in the respective vehicle modules M3 to M6 other than the second gateway unit 20 in the vehicle module M2, the explanation can be made in the same manner as above.

In FIG. 4, the power controller 30 is a function unit that receives power from a power source; for example, from a vehicle battery B or the like, to distribute and supply the power received to power-required devices that require the supply of power in the same vehicle module M. As one example, although the device D, such as the lighting fixture, the air conditioner, the amplifier, the display, or a power window motor, corresponds to a power-required device, the power-required device is not limited to these examples. Here, it is unnecessary to use the vehicle battery B as a power source, and the other power sources such as an alternator or a motor generator (MG) may be used. As illustrated in FIG. 3, although the vehicle battery B is, as one example, provided to the vehicle module M1, and connected with the vehicle module controller 10*a* through a power source line PW, the arrangement or the number of the vehicle batteries B is not limited to this example.

In addition, although not illustrated in the drawings, the vehicle module controller 10 is provided with a DC/DC converter. In each of the vehicle module controllers 10, a voltage received from the vehicle battery B is stepped down by the DC/DC converter and supplied to each vehicle module controllers 10. Here, the gateway unit 20 or the power controller 30 is, for example, constituted as one function of the CPU, and the operating voltage thereof is 5 V, for example. On the other hand, the voltage of the vehicle battery B is normally set to 12 V or higher and hence, in operating the gateway unit 20 or the power controller 30, it is necessary to step down the voltage from the vehicle battery B. Accordingly, for example, a first DC/DC converter of the vehicle module M1 receives power supplied to a first vehicle module controller 10 through the power source line PW, and steps down the voltage of the power to supply the power to the first gateway unit 20 and a first power controller 30. In the same manner as above, a second DC/DC converter of the vehicle module M2 also receives power supplied to a second vehicle module controller 10 through the trunk line TL, and steps down the voltage of the power to supply the power to the second gateway unit 20 and a second power controller 30.

In FIG. 4, while monitoring power use conditions, battery residual quantities, or the like of the whole vehicle, the power controller 30 supplies, when required, required power to loads, devices, or the like that require power, or restricts the power. The power controller 30 is provided with a contact power supply unit 31 and a non-contact power supply unit 32. The contact power supply unit 31 connects the power controller 30 and the device D in the same vehicle module M by wire in a power-transferable manner. In FIG. 4, for example, the contact power supply unit 31 is connected with the devices Da and Db via the intra-module power lines CW2 in a power-transferable manner. The non-contact power supply unit 32 connects the power controller 30 and the device D in the same vehicle module M in such a manner that power can be transferred by non-contact power supply. The non-contact power supply unit 32 adopts a non-contact power supply system, such as an electromagnetic induction system, an electric-wave receiving system, or a resonance system, to connect the power controller 30 and the device D in a power-transferable manner. In FIG. 4, for example, the non-contact power supply unit 32 is connected with a device Dc in such a manner that power can be transferred by non-contact power supply. Although not illustrated in the drawings, the device Dc is connected with the gateway unit 20 by wire or wireless in a communicable manner.

In FIG. 4, the trunk line connection unit 40 is a connector that connects thereto the trunk line TL in a vehicle. As illustrated in FIG. 4, the trunk line TL includes an inter-module communication line TL1 that transmits information between the gateway units 20 of the respective vehicle modules M, and an inter-module power line TL2 that transfers power between the power controllers 30 of the respective vehicle modules M. In FIG. 4, the trunk line connection unit 40 is connected with the other vehicle module controller 10' provided to the other vehicle module M via the trunk lines TL in a communicable and power-transferable manner. Here, the communication protocol of the inter-module communication line TL1 is Ethernet (registered trademark) or the like. The trunk line connection unit 40 is provided with an information transmission unit 41, and a power transfer unit 42. The trunk line connection unit 40 may be an integral-type connector including the information transmission unit 41 and the power transfer unit 42, and each of the information transmission unit 41 and the power transfer unit 42 may be an independent connector.

The information transmission unit 41 connects thereto the other vehicle module controllers 10' and the in-vehicle router R via the inter-module communication lines TL1 in a communicable manner, and connects thereto the devices D in the same vehicle module M via the gateway unit 20 in a communicable manner. In this manner, the trunk line TL connects between the gateway units 20 in the respective vehicle modules M. The power transfer unit 42 connects thereto the other vehicle module controllers 10' and the in-vehicle router R via the inter-module power lines TL2 in a power-transferable manner, and connects thereto the devices D in the same vehicle module M via the power controller 30 in a power-transferable manner. In this manner, the trunk line TL connects between the power controllers 30 in the respective vehicle modules M.

In the present embodiment, the vehicle module M may be, as illustrated in FIG. 5, formed as one unit to which the devices Da to Dc in the same vehicle module M are not connected, and the vehicle module M may be, as illustrated in FIG. 6, formed as one unit to which the devices Da to Dc in the same vehicle module M are connected. That is, as illustrated in FIG. 5, the vehicle module M may include no device D and, as illustrated in FIG. 6, the vehicle module M may include the devices D. In FIG. 5 and FIG. 6, wired communication units 23a and 23b of the vehicle module controller 10 have connectors CTa and CTb for connecting the devices Da and Db at the end portions of connection lines CWa and CWb, respectively. The wireless communication unit 24 of the vehicle module controller 10 is connected with the device Dc in a communicable manner. The trunk line connection unit 40 of the vehicle module controller 10 is connected with the other vehicle modules via the trunk lines TL.

In this manner, the vehicle system 1 according to the present embodiment is provided with the trunk TL that connects between the gateway units 20 arranged in the respective vehicle modules M each modularized depending on the assembly structure of the vehicle and hence, information is transmitted and received between the gateway units 20. Accordingly, when a signal from one device D is, for example, input to the first gateway unit 20, as a result of determination in the transmission determination unit 21, the information is transmitted to the other device D connected to the first gateway unit 20, or the information is transmitted to the other gateway unit 20 such as the second gateway unit 20. For example, the information transmitted from the first gateway unit 20 to the other gateway unit 20 such as the second gateway unit 20 is transmitted to an appropriate device D by the transmission function unit 22 of the other gateway unit 20 such as the second gateway unit 20. As mentioned above, even when devices D different in protocol from each other are mounted on a vehicle module, the devices D can be communicated with each other. Furthermore, each of the vehicle modules M is also provided with the power controller 30 that distributes and supplies power to a power-required device that requires the supply of the power and hence, the vehicle module controller 10 of the vehicle module M can be operated as a common central unit with respect to power distribution and communication in each vehicle module M.

Furthermore, according to the vehicle system 1 in the present embodiment, as illustrated in FIG. 7 to FIG. 9, it is possible to achieve the manufacturing process in which the vehicle modules M1 to M6 including communication devices are assembled and thereafter, the trunk line TL is connected to each of the vehicle modules M1 to M6 thus completing the vehicle. For example, as illustrated in FIG. 7, first of all, in each of six vehicle modules M1 to M6 modularized depending on the respective positions at which the vehicle modules M1 to M6 are provided in the body BD of the vehicle, the device D in each of the vehicle modules M1 to M6 and each of the vehicle module controllers 10a to 10f are connected with each other by wire or wireless in a communicable manner and, at the same time, in such a manner that power can be supplied by contact or non-contact power supply. Next, each of the vehicle modules M1 to M6 constituted in this manner is, as illustrated in FIG. 8, arranged at an appropriate position on the body BD of the vehicle. Furthermore, as illustrated in FIG. 9, trunk lines TLa to TLe are connected to the respective trunk line connection units 40 provided to the vehicle module controllers 10a to 10f arranged in the vehicle modules M1 to M6, respectively. In FIG. 9, the vehicle module M5 and the vehicle module M1 are connected with each other via the trunk line TLa. The vehicle module M5 and the vehicle module M2 are connected with each other via the trunk line TLb. The vehicle module M5 and the vehicle module M3 are connected with each other via the trunk line TLc. The vehicle module M5 and the vehicle module M4 are connected with each other via the trunk line TLd. The vehicle module M5 and the vehicle module M6 are connected with each other via the trunk line TLe. In addition to the procedures illustrated in FIG. 7 to FIG. 9, for example, the vehicle may be completed by the following procedures; that is, each of the vehicle modules M1 to M6 is formed, the trunk lines TL are arranged on the body BD in advance, each of the vehicle modules M1 to M6 is arranged, and the vehicle modules M1 to M6 are connected with the respective trunk lines TL arranged on the body BD.

In this manner, according to the vehicle system 1 in the present embodiment, as illustrated in FIG. 10, it is possible to achieve the manufacturing process in which the vehicle modules M1 to M6 each including communications devices are assembled and thereafter, the trunk line TL is connected to each of the vehicle modules M1 to M6 thus completing the vehicle. As a result, it is possible to provide a vehicle system in which the devices D different in protocol from each other can be communicated with each other, and a vehicle can be completed by combining efficiently the vehicle modules M.

In addition, in the vehicle system 1 according to the present embodiment, it is also possible to share some of the vehicle modules M with different types of vehicles. Furthermore, the various types of vehicle modules M are designed thus constructing easily a large variety of vehicle systems 1 by adopting different combinations of the vehicle modules M. In the vehicle system 1 according to the present embodiment, when repairing a vehicle, it is also possible to easily replace vehicle modules M to be repaired, which constitute a part of the vehicle system 1. Furthermore, in the vehicle system 1 according to the present embodiment, when upgrading a vehicle, it is also possible to easily change vehicle modules M to be upgraded, which constitute a part of the vehicle system 1.

Although the present invention has been explained based on the embodiment heretofore, the present invention is not limited to the above-mentioned embodiment, various modifications can be made without departing from the gist of the present invention, and other techniques may optionally be used by combining the techniques with the embodiment to the extent possible.

For example, in the present embodiment, although the vehicle modules M1 to M6 are explained by taking six vehicle modules modularized depending on the respective positions at which the vehicle modules M1 to M6 are arranged in the body DB of a vehicle, as an example, the present invention is not limited to this example. The vehicle module M is modularized depending on the assembly structure of the vehicle. For example, in the case of a structure in which a vehicle is assembled by stacking structural modules that constitute the vehicle, the vehicle module M may be designed as a communication and power-control module formed in a stackable manner so as to correspond to such a structural module. In the same manner as above, for example, in the case of a structure in which a vehicle is assembled by arranging structural modules that constitute the vehicle in a juxtaposed manner, the vehicle module M may be designed as a communication and power-control module formed in such a manner that the communication and power-control module can be arranged in parallel so as to correspond to such a structural module.

Furthermore, in the present embodiment, although the explanation is made with respect to the example in which the power controller 30 is provided to each of the vehicle modules M1 to M6, the present invention is not limited to this example. The power controller 30 may be provided to some of the vehicle modules M out of the vehicle modules M1 to M6.

In the present embodiment, although the explanation is made with respect to the vehicle system 1 that includes six vehicle modules M1 to M6 each provided with at least the gateway unit 20 in the vehicle, the vehicle system 1 may include other module provided with no gateway unit 20 other than these six vehicles modules M.

In the present embodiment, although the explanation is made with respect to the example in which the vehicle module controller 10e in the vehicle module M5 connects thereto the vehicle module controllers 10a to 10d, and 10f arranged in the other vehicle modules M1 to M4, and M6, respectively, via the trunk lines TL, the present invention is not limited to this example. Even in a vehicle module controller 10 in any vehicle module M out of the vehicle modules M1 to M6, it may be possible to adopt a vehicle module controller 10 having a general control function in the same manner as the case of the vehicle module controller 10e of the present embodiment. Furthermore, it is unnecessary to indirectly connect the vehicle modules M1 to M4, and M6 to the vehicle module M5 via the trunk lines TL, and the vehicle modules M1 to M6 may be directly connected to each other via the trunk lines TL.

In the present embodiment, although the explanation is made with respect to the example in which the in-vehicle router R is connected to the vehicle module controller 10e in the vehicle module M5 via the trunk line TL, the present invention is not limited to this example. The in-vehicle router R may be connected to the vehicle module controller 10f in the vehicle module M6 via the trunk line TL. Furthermore, it may be possible not only to connect directly the in-vehicle router R to the vehicle module M5 via the trunk line TL, but also to connect directly the in-vehicle router R to the other vehicle modules M1 to M4, and M6 via the trunk lines TL.

Furthermore, in the present embodiment, although the explanation is made with respect to the example in which the trunk line TL is constituted of the inter-module communication line TL1 and the inter-module power line TL2 that connect between the vehicle module controllers 10 of the respective vehicle modules M1 to M6, the present invention is not limited to this example. The vehicle module controllers 10 of the respective vehicle modules M1 to M6 may be constituted so as to be connected to each other in a communicable manner not only by wire but also wirelessly, and may further be constituted so as to be connected to each other in such a manner that power can be supplied not only by contact power supply but also by non-contact power supply.

The vehicle system according to the embodiments is provided with vehicle modules each of which is modularized depending on the assembly structure of a vehicle, the vehicle module having the gateway unit connected with a plurality of devices different in protocol from each other in the vehicle in a communicable manner; and the trunk line that connects between the gateway units of the respective vehicle modules. Hence, it is possible to achieve the manufacturing process in which the vehicle modules each including communication devices are assembled and thereafter, the trunk line is connected to each vehicle module thus completing the vehicle. As a result, it is possible to provide the vehicle system in which the vehicle modules can be communicated with each other in the vehicle even when the devices different in protocol from each other are mounted on the vehicle modules, and the vehicle can be completed by combining efficiently the vehicle modules.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle system comprising:
   a plurality of vehicle modules each modularized depending on an assembly structure of a vehicle, the vehicle modules each including a vehicle module controller connected with a plurality of devices different in protocol from each other in the vehicle in a communicable manner; and
   a plurality of trunk lines, each of the trunk lines is connected between a respective pair of the vehicle module controllers, wherein
   each of at least a pair of the vehicle module controllers includes,
      a power controller configured to receive power from a vehicle battery, and distribute and supply the power received to each of the plurality of devices,
      a gateway unit connecting with the plurality of devices, and
      a trunk line connection unit connecting a respective one of the trunk lines to each of the gateway unit and the power controller.

2. The vehicle system according to claim 1, wherein
   each of the vehicle modules is modularized depending on
      a position of the vehicle module provided to a body of the vehicle.

3. The vehicle system according to claim 2, wherein the gateway unit includes
   a transmission determination unit connected to two or more devices different in protocol from each other in the same vehicle module in a communicable manner, the transmission determination unit being configured to determine, when a signal is input from any of the devices connected in a communicable manner to the transmission determination unit, a device or other gateway unit each constituting a transmission destination of information corresponding to the signal input, and transmit the information to the transmission destination, and
   a transmission function unit configured to receive an input of the information transmitted by the transmission determination unit of the other gateway unit, determine a device constituting a transmission destination of the information input, and transmit the information to the transmission destination.

4. The vehicle system according to claim 2, wherein
   the gateway unit is connected with an in-vehicle router capable of communicating with communication devices outside the vehicle via the trunk lines.

5. The vehicle system according to claim 2, wherein at least one of the vehicle modules includes
   a front module provided to a front part of the body of the vehicle,
   an instrument panel module provided adjacent to the front part of the body of the vehicle in an instrument panel arranged in a passenger compartment,
   a rear module provided to a rear part of the body of the vehicle,
   a first floor module provided along a floor located between the front part and the rear part of the body of the vehicle,
   a second floor module provided along the floor of the body of the vehicle in parallel with the first floor module, and
   a roof module provided to a roof arranged to face the floor of the body of the vehicle in a height direction.

6. The vehicle system according to claim 1, wherein the gateway unit includes
   a transmission determination unit connected to two or more devices different in protocol from each other in the same vehicle module in a communicable manner, the transmission determination unit being configured to determine, when a signal is input from any of the devices connected in a communicable manner to the transmission determination unit, a device or other gateway unit each constituting a transmission destination of information corresponding to the signal input, and transmit the information to the transmission destination, and
   a transmission function unit configured to receive an input of the information transmitted by the transmission determination unit of the other gateway unit, determine a device constituting a transmission destination of the information input, and transmit the information to the transmission destination.

7. The vehicle system according to claim 6, wherein
   the gateway unit includes a wired communication unit connecting the gateway unit and the device in at least the same vehicle module by wire in a communicable manner.

8. The vehicle system according to claim 7, wherein
   the gateway unit includes a wireless communication unit connecting the gateway unit and the device in at least the same vehicle module wirelessly in a communicable manner.

9. The vehicle system according to claim 7, wherein
   the gateway unit is connected with an in-vehicle router capable of communicating with communication devices outside the vehicle via the trunk lines.

10. The vehicle system according to claim 7, wherein at least one of the vehicle modules includes
    a front module provided to a front part of the body of the vehicle,
    an instrument panel module provided adjacent to the front part of the body of the vehicle in an instrument panel arranged in a passenger compartment,
    a rear module provided to a rear part of the body of the vehicle,
    a first floor module provided along a floor located between the front part and the rear part of the body of the vehicle,
    a second floor module provided along the floor of the body of the vehicle in parallel with the first floor module, and
    a roof module provided to a roof arranged to face the floor of the body of the vehicle in a height direction.

11. The vehicle system according to claim 6, wherein
    the gateway unit includes a wireless communication unit connecting the gateway unit and the device in at least the same vehicle module wirelessly in a communicable manner.

12. The vehicle system according to claim 6, wherein the trunk line includes
    an inter-module communication line configured to transmit information between the gateway units in the respective vehicle modules, and
    an inter-module power line configured to transfer power between the power controllers in the respective vehicle modules.

13. The vehicle system according to claim 6, wherein
    the gateway unit is connected with an in-vehicle router capable of communicating with communication devices outside the vehicle via the trunk lines.

14. The vehicle system according to claim 6, wherein at least one of the vehicle modules includes
- a front module provided to a front part of the body of the vehicle,
- an instrument panel module provided adjacent to the front part of the body of the vehicle in an instrument panel arranged in a passenger compartment,
- a rear module provided to a rear part of the body of the vehicle,
- a first floor module provided along a floor located between the front part and the rear part of the body of the vehicle,
- a second floor module provided along the floor of the body of the vehicle in parallel with the first floor module, and
- a roof module provided to a roof arranged to face the floor of the body of the vehicle in a height direction.

15. The vehicle system according to claim 1, wherein the gateway unit is connected with an in-vehicle router capable of communicating with communication devices outside the vehicle via the trunk lines.

16. The vehicle system according to claim 1, wherein at least one of the vehicle modules includes
- a front module provided to a front part of the body of the vehicle,
- an instrument panel module provided adjacent to the front part of the body of the vehicle in an instrument panel arranged in a passenger compartment,
- a rear module provided to a rear part of the body of the vehicle,
- a first floor module provided along a floor located between the front part and the rear part of the body of the vehicle,
- a second floor module provided along the floor of the body of the vehicle in parallel with the first floor module, and
- a roof module provided to a roof arranged to face the floor of the body of the vehicle in a height direction.

17. A vehicle module system comprising:
- a first vehicle module that includes,
  - a first gateway unit connected with a first plurality of devices different in protocol from each other in a vehicle in a communicable manner,
  - a first power controller configured to receive power from a vehicle battery, and distribute and supply the power received to each of the first plurality of devices, and
  - a trunk line connection unit configured to connect one or more trunk lines in a vehicle, the trunk line connection unit configured to connect the one or more trunks lines to each of the first gateway unit and the first power controller; and
- a second vehicle module that includes,
  - a second gateway unit connected with a second plurality of devices different in protocol from each other in a vehicle in a communicable manner, and
  - a second power controller configured to receive power from a vehicle battery, and distribute and supply the power received to each of the second plurality of devices.

* * * * *